US012707479B2

(12) United States Patent
Guo et al.

(10) Patent No.: US 12,707,479 B2
(45) Date of Patent: Aug. 11, 2026

(54) METHODS AND APPARATUSES FOR SIDELINK POSITIONING

(71) Applicant: LENOVO (BEIJING) LIMITED, Beijing (CN)

(72) Inventors: Xin Guo, Beijing (CN); Haipeng Lei, Beijing (CN); Zhennian Sun, Beijing (CN); Xiaodong Yu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 392 days.

(21) Appl. No.: 18/551,093

(22) PCT Filed: Mar. 19, 2021

(86) PCT No.: PCT/CN2021/081885
§ 371 (c)(1),
(2) Date: Sep. 18, 2023

(87) PCT Pub. No.: WO2022/193314
PCT Pub. Date: Sep. 22, 2022

(65) Prior Publication Data
US 2024/0306164 A1 Sep. 12, 2024

(51) Int. Cl.
*H04W 72/25* (2023.01)
*H04W 72/02* (2009.01)
(Continued)

(52) U.S. Cl.
CPC ........... *H04W 72/25* (2023.01); *H04W 72/02* (2013.01); *H04W 72/046* (2013.01); *H04W 72/51* (2023.01)

(58) Field of Classification Search
None
See application file for complete search history.

(56) References Cited

U.S. PATENT DOCUMENTS

2019/0059071 A1 2/2019 Khoryaev
2021/0160712 A1* 5/2021 Tadayon ............ H04W 64/006
(Continued)

FOREIGN PATENT DOCUMENTS

CN 110998353 A 4/2020
CN 111712720 A 9/2020
(Continued)

OTHER PUBLICATIONS

International Search Report and Written Opinion dated Dec. 15, 2021 for International Application No. PCT/CN2021/081885.

*Primary Examiner* — Anh Vu H Ly
(74) *Attorney, Agent, or Firm* — AMPACC Law Group, PLLC

(57) ABSTRACT

Embodiments of the present application relate to methods and apparatuses for sidelink (SL) positioning. According to an embodiment of the present application, a method may include: receiving configuration information for SL positioning, wherein the configuration information for SL positioning includes at least one of: configuration of at least one panel pattern, wherein each panel pattern of the at least one panel pattern includes one or more panels; at least one resource allocation principle associated with the at least one panel pattern; and at least one beam allocation principle associated with the at least one panel pattern; and transmitting an SL positioning reference signal (SL-PRS) according to the received configuration information for SL positioning. Embodiments of the present application can support more efficient multiple-node UE positioning with low signaling overhead.

18 Claims, 8 Drawing Sheets

(51) Int. Cl.

| | |
|---|---|
| ***H04W 72/044*** | (2023.01) |
| ***H04W 72/51*** | (2023.01) |

(56) References Cited

U.S. PATENT DOCUMENTS

| | | | | |
|---|---|---|---|---|
| 2022/0201774 | A1* | 6/2022 | Bao | G01S 5/0072 |
| 2023/0361955 | A1* | 11/2023 | Ganesan | H04L 5/0048 |
| 2024/0063862 | A1* | 2/2024 | Manolakos | G01S 5/0236 |

FOREIGN PATENT DOCUMENTS

| | | | |
|---|---|---|---|
| CN | 111756494 | A | 10/2020 |
| CN | 112166575 | A | 1/2021 |
| WO | 2019145095 | A1 | 8/2019 |

* cited by examiner

METHODS AND APPARATUSES FOR SIDELINK POSITIONING

TECHNICAL FIELD

Embodiments of the present application generally relate to wireless communication technologies, and especially to methods and apparatuses for sidelink (SL) positioning.

BACKGROUND

Vehicle positioning is one of the most important technologies for enabling autonomous driving. Compared to general positioning, vehicle positioning faces a big challenge due to stringent requirements of high accuracy and low latency. Specifically, for medium to short-range positioning (e.g., tens to several meters), the general positioning technologies which position a target vehicle user equipment (TVUE) as a single-point object are no longer sufficient. Moreover, the geometric information (e.g., size and orientation) of the TVUE is also required for safe and accurate driving.

Given the above, the industry desires an improved technology for SL positioning, which can support more efficient multiple-node user equipment (UE) positioning with low signaling overhead.

SUMMARY OF THE DISCLOSURE

Embodiments of the present application at least provide a technical solution for SL positioning, which can at least support more efficient multiple-node UE positioning with low signaling overhead.

According to some embodiments of the present application, a method performed by a UE may include: receiving configuration information for SL positioning, wherein the configuration information for SL positioning includes at least one of: configuration of at least one panel pattern, wherein each panel pattern of the at least one panel pattern includes one or more panels; at least one resource allocation principle associated with the at least one panel pattern; and at least one beam allocation principle associated with the at least one panel pattern; and transmitting an SL positioning reference signal (SL-PRS) according to the received configuration information for SL positioning.

In some embodiments, the configuration information for SL positioning is received in a resource pool configuration of a resource pool; the configuration information for SL positioning is received in a zone configuration of a zone; or the configuration information for SL positioning is specific to the UE.

In some embodiments, the configuration information for SL positioning is received via at least one of: a system information block (SIB) from a network; radio resource control (RRC) signaling from the network; a medium access control (MAC) control element (CE) from the network; PC5 RRC signaling from a second UE; a MAC CE from the second UE; sidelink control information (SCI) from the second UE; and pre-configuration.

In some embodiments, the configuration of at least one panel pattern includes configuration of each panel pattern of the at least one panel pattern, and the configuration of each panel pattern includes at least one of: a panel pattern index indicating a corresponding panel pattern; information of a panel plane on which one or more panels of the corresponding panel pattern are deployed; information of a panel sequence indicating distribution information of the one or more panels of the corresponding panel pattern on the panel plane; and information of a reference panel.

In an embodiment, the panel pattern index is associated with a total transmission power for transmitting the SL-PRS.

In some embodiments, the at least one resource allocation principle includes one resource allocation principle for all of the at least one panel pattern, and wherein the one resource allocation principle indicates at least one of: SL-PRS resources are uniformly allocated to all panels of each panel pattern of the at least one panel pattern; and a transmission power is uniformly allocated among all panels of each panel pattern of the at least one panel pattern.

In some embodiments, each of the at least one resource allocation principle is associated with a corresponding panel pattern of the at least one panel pattern, and wherein each resource allocation principle indicates at least one of: SL-PRS resources are uniformly allocated to all panels of the corresponding panel pattern; and a transmission power is uniformly allocated among all panels of the corresponding panel pattern.

In an embodiment, the SL-PRS resources include one of: SL-PRS resources in frequency domain; SL-PRS resources in time domain; and SL-PRS resources in frequency domain and time domain.

In some embodiments, the at least one beam allocation principle includes one beam allocation principle for all of the at least one panel pattern, and wherein the one beam allocation principle indicates that beams used by the UE are uniformly allocated to all panels of each panel pattern of the at least one panel pattern.

In some embodiments, each of the at least one beam allocation principle is associated with a corresponding panel pattern of the at least one panel pattern, and wherein each beam allocation principle indicates that beams used by the UE are uniformly allocated to all panels of the corresponding panel pattern.

In some embodiments, the method further includes: determining a set of resources for transmitting the SL-PRS according to the received configuration information for SL positioning; and wherein transmitting the SL-PRS includes transmitting the SL-PRS based on the determined set of resources.

In an embodiment, determining the set of resources includes at least one of: selecting a panel pattern including a set of panels from the at least one panel pattern; selecting a beam pattern including a set of beams; selecting an SL-PRS pattern and a set of SL-PRS resources to be used for the SL-PRS pattern; allocating the set of SL-PRS resources to the set of panels of the selected panel pattern based on a resource allocation principle associated with the selected panel pattern; and allocating the set of SL-PRS resources to the set of beams of the selected beam pattern based on a beam allocation principle associated with the selected panel pattern.

In another embodiment, the method further includes: transmitting a panel pattern index of the selected panel pattern in SCI or physical sidelink shared channel (PSSCH).

In yet another embodiment, the SL-PRS implicitly indicates a panel pattern index of the selected panel pattern.

In yet another embodiment, the method further includes: transmitting an indication of a total transmission power for transmitting the SL-PRS.

In yet another embodiment, the method further includes: transmitting assistance information associated with the selected panel pattern in SCI or PSSCH.

In yet another embodiment, the method further includes: transmitting an indication of a UE type of the UE.

In yet another embodiment, the method further includes: receiving, from a second UE, a measurement result of the SL-PRS and assistance information of the second UE; and estimating location estimation and orientation information of the UE based on the measurement result and the assistance information.

In yet another embodiment, the assistance information of the second UE indicates a panel pattern of the second UE based on which the second UE determines the measurement result.

According to some other embodiments of the present application, a method performed by a UE may include: receiving configuration information for SL positioning, wherein the configuration information for SL positioning includes at least one of: configuration of at least one panel pattern, wherein each panel pattern of the at least one panel pattern includes one or more panels; at least one resource allocation principle associated with the at least one panel pattern; and at least one beam allocation principle associated with the at least one panel pattern; and receiving an SL-PRS.

In some embodiments, the configuration information for SL positioning is received in a resource pool configuration of a resource pool; the configuration information for SL positioning is received in a zone configuration of a zone; or the configuration information for SL positioning is specific to the UE.

In some embodiments, the configuration information for SL positioning is received via at least one of: a SIB from a network; RRC signaling from the network; a MAC CE from the network; PC5 RRC signaling from a second UE; a MAC CE from the second UE; SCI from the second UE; and pre-configuration.

In some embodiments, the configuration of at least one panel pattern includes configuration of each panel pattern of the at least one panel pattern, and the configuration of each panel pattern includes at least one of: a panel pattern index indicating a corresponding panel pattern; information of a panel plane on which one or more panels of the corresponding panel pattern are deployed; information of a panel sequence indicating distribution information of the one or more panels of the corresponding panel pattern on the panel plane; and information of a reference panel.

In some embodiments, the at least one resource allocation principle includes one resource allocation principle for all of the at least one panel pattern, and wherein the one resource allocation principle indicates at least one of: SL-PRS resources are uniformly allocated to all panels of each panel pattern of the at least one panel pattern; and a transmission power is uniformly allocated among all panels of each panel pattern of the at least one panel pattern.

In some embodiments, each of the at least one resource allocation principle is associated with a corresponding panel pattern of the at least one panel pattern, and wherein each resource allocation principle indicates at least one of: SL-PRS resources are uniformly allocated to all panels of the corresponding panel pattern; and a transmission power is uniformly allocated among all panels of the corresponding panel pattern.

In an embodiment, the SL-PRS resources include one of: SL-PRS resources in frequency domain; SL-PRS resources in time domain; and SL-PRS resources in frequency domain and time domain.

In some embodiments, the at least one beam allocation principle includes one beam allocation principle for all of the at least one panel pattern, and wherein the one beam allocation principle indicates that beams used by the UE are uniformly allocated to all panels of each panel pattern of the at least one panel pattern.

In some embodiments, each of the at least one beam allocation principle is associated with a corresponding panel pattern of the at least one panel pattern, and wherein each beam allocation principle indicates that beams used by the UE are uniformly allocated to all panels of the corresponding panel pattern.

In some embodiments, the method further includes: receiving a panel pattern index of a panel pattern used for transmitting the SL-PRS in SCI or PSSCH.

In some embodiments, the SL-PRS implicitly indicates a panel pattern index of a panel pattern used for transmitting the SL-PRS.

In an embodiment, the panel pattern index is associated with a total transmission power for transmitting the SL-PRS.

In some embodiments, the method further includes: receiving an indication of a total transmission power for transmitting the SL-PRS.

In some embodiments, the method further includes: receiving assistance information associated with a panel pattern used for transmitting the SL-PRS in SCI or PSSCH.

In some embodiments, the method further includes: receiving an indication of a UE type of a second UE transmitting the SL-PRS.

In some embodiments, the method further includes: performing a measurement on the received SL-PRS to determine a measurement result of the SL-PRS; and estimating location estimation and orientation information of a second UE transmitting the SL-PRS based on the measurement result of the SL-PRS and a panel pattern used for transmitting the SL-PRS.

In some embodiments, the method further includes: performing a measurement on the received SL-PRS to determine a measurement result of the SL-PRS; and transmitting, to a second UE transmitting the SL-PRS, the measurement result of the SL-PRS and assistance information of the UE; wherein the assistance information of the UE indicates a panel pattern of the UE based on which the UE determines the measurement result.

According to some embodiments of the present application, a method may include: transmitting configuration information for SL positioning, wherein the configuration information for SL positioning includes at least one of: configuration of at least one panel pattern, wherein each panel pattern of the at least one panel pattern includes one or more panels; at least one resource allocation principle associated with the at least one panel pattern; and at least one beam allocation principle associated with the at least one panel pattern.

In some embodiments, the configuration information for SL positioning is transmitted in a resource pool configuration of a resource pool; the configuration information for SL positioning is transmitted in a zone configuration of a zone; or the configuration information for SL positioning is specific to a UE.

In some embodiments, the configuration information for SL positioning is transmitted via at least one of: a SIB; RRC signaling; and a MAC CE.

In some embodiments, the configuration of at least one panel pattern includes configuration of each panel pattern of the at least one panel pattern, and the configuration of each panel pattern includes at least one of: a panel pattern index indicating a corresponding panel pattern; information of a panel plane on which one or more panels of the corresponding panel pattern are deployed; information of a panel sequence indicating distribution information of the one or more panels of the corresponding panel pattern on the panel plane; and information of a reference panel.

In some embodiments, the at least one resource allocation principle includes one resource allocation principle for all of the at least one panel pattern, and wherein the one resource allocation principle indicates at least one of: SL-PRS resources are uniformly allocated to all panels of each panel pattern of the at least one panel pattern; and a transmission power is uniformly allocated among all panels of each panel pattern of the at least one panel pattern.

In some embodiments, each of the at least one resource allocation principle is associated with a corresponding panel pattern of the at least one panel pattern, and wherein each resource allocation principle indicates at least one of: SL-PRS resources are uniformly allocated to all panels of the corresponding panel pattern; and a transmission power is uniformly allocated among all panels of the corresponding panel pattern.

In an embodiment, the SL-PRS resources include one of: SL-PRS resources in frequency domain; SL-PRS resources in time domain; and SL-PRS resources in frequency domain and time domain.

In some embodiments, the at least one beam allocation principle includes one beam allocation principle for all of the at least one panel pattern, and wherein the one beam allocation principle indicates that beams used by the UE are uniformly allocated to all panels of each panel pattern of the at least one panel pattern.

In some embodiments, each of the at least one beam allocation principle is associated with a corresponding panel pattern of the at least one panel pattern, and wherein each beam allocation principle indicates that beams used by the UE are uniformly allocated to all panels of the corresponding panel pattern.

Some embodiments of the present application also provide an apparatus including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
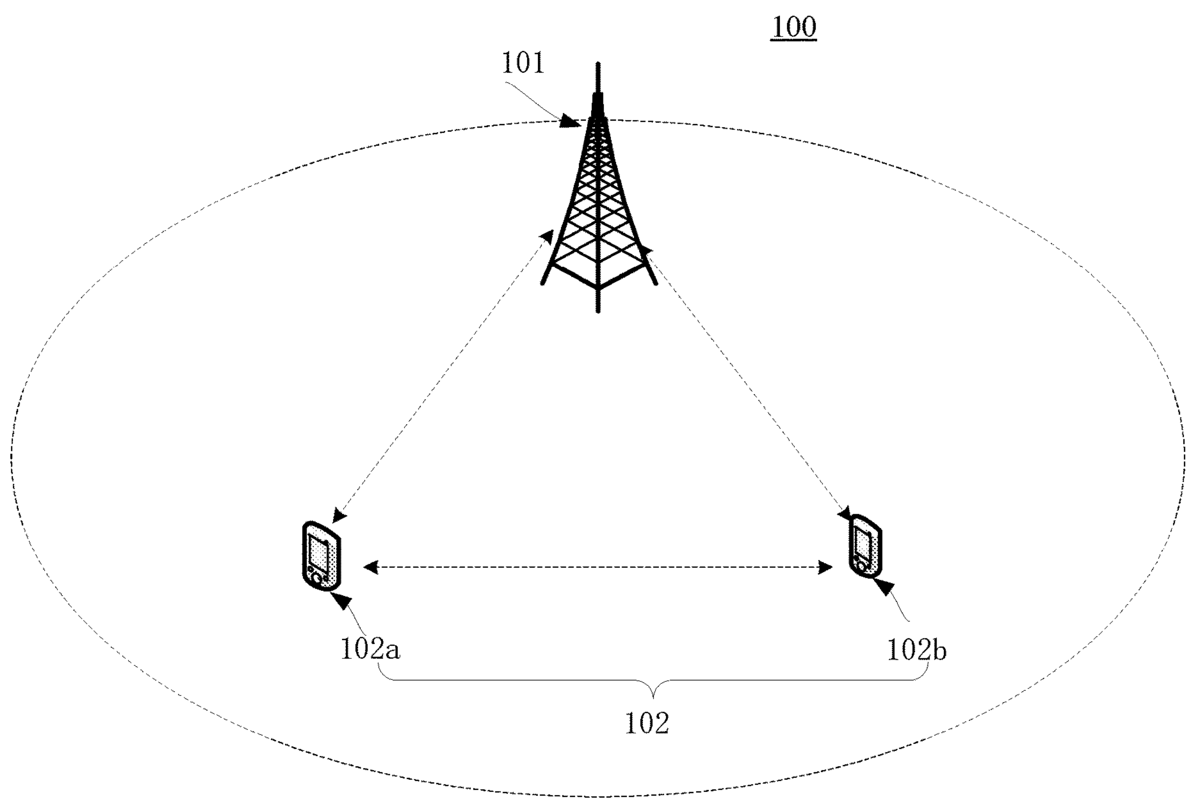
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UEs 102 (e.g., a UE 102*a* and a UE 102*b*) for illustrative purpose. Although a specific number of BS 101 and UEs 102 are depicted in FIG. 1, it is contemplated that any number of BSs 101 and UEs 102 may be included in the wireless communication system 100.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

According to some embodiments of the present application, the UE(s) 102 may include vehicle UEs (VUEs), vulnerable road user (VRUs), public safety UEs (PS-UEs), and/or commercial sidelink UEs (CS-UEs) that are sensitive to power consumption. In an embodiment of the present application, a VRU may include a pedestrian UE (P-UE), a cyclist UE, a wheelchair UE or other UEs which require power saving compared with a VUE.

According to some other embodiments of the present application, the UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present application, the UE(s) 102 may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present application, the UE(s) 102 may include wearable devices, such as smart watches, fitness bands, optical head-mounted displays, or the like.

Moreover, the UE(s) 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

Both the UE 102*a* and the UE 102*b* in the embodiments of FIG. 1 may transmit information to the BS 101 and receive control information from the BS 101, for example, via LTE or new radio (NR) Uu interface.

According to some embodiments of FIG. 1, the UE 102*a* may function as a transmitting (Tx) UE, and the UE 102*b* may function as a receiving (Rx) UE. The UE 102*a* may transmit messages to the UE 102*b* through a sidelink, for example, PC5 interface as defined in 3GPP TS 23.303. According to some other embodiments of FIG. 1, the UE 102*b* may function as a Tx UE and transmit messages, and the UE 102*a* may function as an Rx UE and receive the messages from the UE 102*b*. In an embodiment of the present application, the UE 102*a* and the UE 102*b* may be VUEs.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Vehicle positioning is one of the most important technologies for enabling autonomous driving. Compared to general positioning, vehicle positioning faces a big challenge due to stringent requirements of high accuracy and low latency. Existing vehicle positioning technologies can be classified into the following two categories.

One vehicle positioning technology is single-point VUE positioning (SPVP). The SPVP refers to positioning a VUE as a single-point object. Global positioning system (GPS) is the most popular SPVP technology, which may suffer from performance degradation in urban environment due to loss of line-of-sight (LoS) links between GPS receivers and satellites. An alternative SPVP technology is a radio access technology (RAT) dependent technology, which relies on one or more BSs in wireless networks to estimate the position of a VUE by triangularization. However, the RAT-dependent technology faces a negative effect of mobility on estimation accuracy and cannot work when the VUE is out of coverage of the BS(s).

In addition, for medium to short-range positioning (e.g., tens to several meters), the SPVP which positions a TVUE as a single-point object is no longer sufficient. Moreover, the geometric information (e.g., size and orientation) of the TVUE is also required for safe and accurate driving.

In order to solve the above technical problem, multi-point VUE positioning (MPVP) is used as another vehicle positioning technology. The MPVP refers to positioning a VUE as a multi-point object where each point of the object corresponds to an antenna or an antenna array. In NR standardization, the Tx VUE and the Rx VUE may be equipped with multiple antenna arrays, and each antenna array may be referred to as a panel. These multiple panels may be distributed around the VUE to support NR sidelink communication between VUEs. By detecting the cooperative signals transmitted by multiple panels distributed at a TVUE, a measuring VUE (MVUE) can estimate positions of the multiple panels. These positions may represent the skeleton of the TVUE.

Compared to radio-detection-and-ranging (RADAR) based positioning which needs to scan an object to determine the existence of the object, the method of MPVP explicitly indicates the existence of a TVUE by transmitting positioning signals, which can remove the time consumed on scanning and target recognizing processes, thereby facilitating real-time positioning.

Compared to SPVP, the method of MPVP can increase the probability of LoS link, and thus can increase positioning accuracy. Moreover, compared to SPVP, the method of MPVP may further estimate a TVUE's geometric information such as orientation.

Although MPVP has been proved to have multiple benefits in academic, the method of MPVP faces a key challenge of realization in a real communication system. For example, the MPVP may need efficient cooperation among corresponding entities (such as TVUE and MVUE), which may dominate the performance of MPVP. However, such efficient cooperation may bring significant signaling overhead. How to implement the efficient MPVP in sidelink has not been discussed yet.

Given the above, embodiments of the present application may provide technical solutions for sidelink positioning, which can support more efficient multiple-node UE positioning (e.g., MPVP) with low signaling overhead. More details on embodiments of the present application will be described in the following text in combination with the appended drawings.

In order to implement the SL positioning with low signaling overhead, according to some embodiments of the present application, a UE (e.g., a Tx UE or an Rx UE) may receive configuration information for SL positioning. In an embodiment of the present application, the Tx UE may be a target UE (e.g., UE 102*a*) which transmits an SL-PRS and is to be positioned; the Rx UE may be a measuring UE (e.g., UE 102*b*) which performs measurement on the SL-PRS for positioning the target UE.

In an embodiment of the present application, the configuration information for SL positioning may be configured per resource pool. That is, each resource pool may have corresponding configuration information for SL positioning. In this embodiment, the UE may receive the configuration information for SL positioning in a resource pool configuration of a resource pool.

In another embodiment, the configuration information for SL positioning may be configured per zone. That is, each zone may have corresponding configuration information for SL positioning. In this embodiment, the UE may receive the configuration information for SL positioning in a zone configuration of a zone.

In another embodiment, the configuration information may be configured per UE. That is, each UE may be configured with corresponding configuration information for SL positioning. In this embodiment, the UE may receive the configuration information for SL positioning specific to the UE. In some embodiments, in order to implement the SL positioning, the UE may transmit the configuration information for SL positioning specific to the UE to one or more other UEs.

According to some embodiments of the present application, the UE may receive the configuration information for SL positioning from a network (e.g., BS 101 in FIG. 1). In an embodiment of the present application, the network may transmit the configuration information for SL positioning via a SIB (e.g., in the SIB). Consequently, the UE may receive the configuration information for SL positioning via the SIB. In another embodiment of the present application, the network may transmit the configuration information for SL positioning via RRC signaling to the UE, such that the UE may receive the configuration information for SL positioning via the RRC signaling. In yet another embodiment of the present application, the network may transmit the configuration information for SL positioning via a MAC CE to the UE, such that the UE may receive the configuration information for SL positioning via the MAC CE.

According to some other embodiments of the present application, the UE may receive the configuration information for SL positioning from another UE different from the UE. In an embodiment of the present application, the UE (e.g., UE 102*a*) may receive the configuration information for SL positioning via PC5 RRC signaling from another UE (e.g., UE 102*b* or another UE not shown in FIG. 1). In another embodiment of the present application, the UE may receive the configuration information for SL positioning via a MAC CE from another UE. In yet another embodiment of the present application, the UE may receive the configuration information for SL positioning via SCI from another UE.

According to some other embodiments of the present application, the UE may receive the configuration information for SL positioning via pre-configuration. For example, the configuration information for SL positioning may be preconfigured in the UE, for example, in a subscriber identity module (SIM), in a universal subscriber identity module (USIM), or in a memory of the UE. Therefore, receiving the configuration information for SL positioning may refer to accessing the SIM, the USIM or the memory for acquiring the configuration information for SL positioning inside the UE.

The configuration information for SL positioning may include at least one of:

1) configuration of at least one panel pattern, each of which may include one or more panels;
2) at least one resource allocation principle associated with the at least one panel pattern; and
3) at least one beam allocation principle associated with the at least one panel pattern.

Configuration of Panel Pattern

The configuration of at least one panel pattern may include configuration of each panel pattern of the at least one panel pattern. Configuration of each panel pattern may indicate a distribution of one or more panels of the corresponding panel pattern. Positions of the one or more panels may represent the skeleton of the UE. The configuration of each panel pattern may include at least one of:

- a panel pattern index indicating a corresponding panel pattern;
- information of a panel plane on which one or more panels of the corresponding panel pattern are deployed;
- information of a panel sequence indicating distribution information of the one or more panels of the corresponding panel pattern on the panel plane; and
- information of a reference panel.

Figure 2:
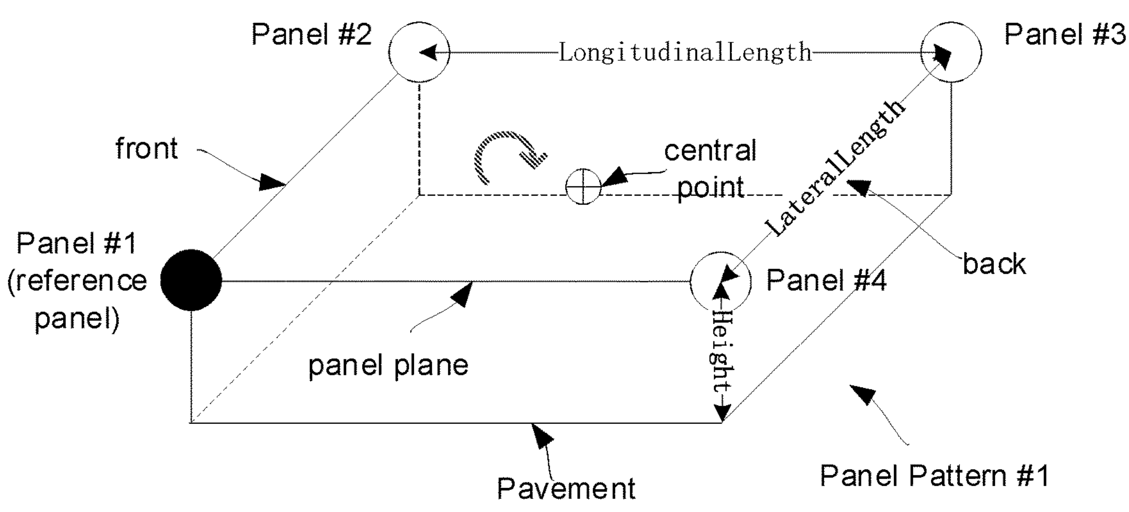
FIG. 2 illustrates an exemplary panel pattern from side view according to some embodiments of the present application.

In some embodiments of the present application, a panel plane may be a horizontal plane. The information of the panel plane may include parameters such as a lateral length, a longitude length, and a height (e.g., relative to a pavement) of the panel plane as shown in FIG. 2. In an embodiment of the present application, the information of the panel plane may be referred to as size information of the panel plane.

In some other embodiments of the present application, the information of a panel plane may be not explicitly included in the configuration of a panel pattern. In such embodiments, when the information of the panel plane is needed by a UE (e.g., a target UE or a measuring UE), the UE may use default values (e.g., the default lateral length, default longitude length, and default height) of the panel plane. The default values of the panel plane may be transmitted via an SIB from the network, RRC signaling from the network, a MAC CE from the network, PC5 RRC signaling from another UE, a MAC CE from another UE, SCI from another UE, or pre-configured for the UE.

In some other embodiments of the present application, the information of a panel plane may be not explicitly included in the configuration of a panel pattern, but is indicated by UE size related information of a UE (e.g., the target UE or a measuring UE). The UE size related information may be implicitly indicated by a UE type. In an embodiment of the present application, the UE may transmit an indication indicating a UE type of the UE to another UE. After receiving the indication of the UE type from the target UE, the measuring UE may determine the information of a panel plane of the target UE.

In some other embodiments of the present application, the information of the reference panel may indicate a front side of the panel plane. In an embodiment, the information of the reference panel may indicate a first panel in the panel sequence which is located on a front side of the panel plane. In another embodiment, the reference panel may be any panel located on the panel plane. The reference panel may be mapped to the first SL-PRS resource set which includes one or more resources with the lowest frequencies among all the SL-PRS resource sets, such that the front side of the panel plane may be determined based on the mapping order starting from the reference panel.

According to some embodiments of the present application, the information of a panel sequence may include a sequence of elements, and each element may represent a panel of the panel pattern. Each element may include the following information: an index of a panel; and a position of the panel on the panel plane. For example, it is assumed that there are four panels (e.g., panel #1, panel #2, panel #3, and panel #4) in a panel pattern. The information of the panel sequence may include four elements. The first element may represent the first panel and may include the following information: a panel index "1" and the position of panel #1 on the panel plane. The second element may represent the second panel and may include the following information: a panel index "2" and the position of panel #2 on the panel plane. The third element may represent the third panel and may include the following information: a panel index "3" and the position of panel #3 on the panel plane. The fourth element may represent the fourth panel and may include the following information: a panel index "4" and the position of panel #4 on the panel plane.

Figure 3:
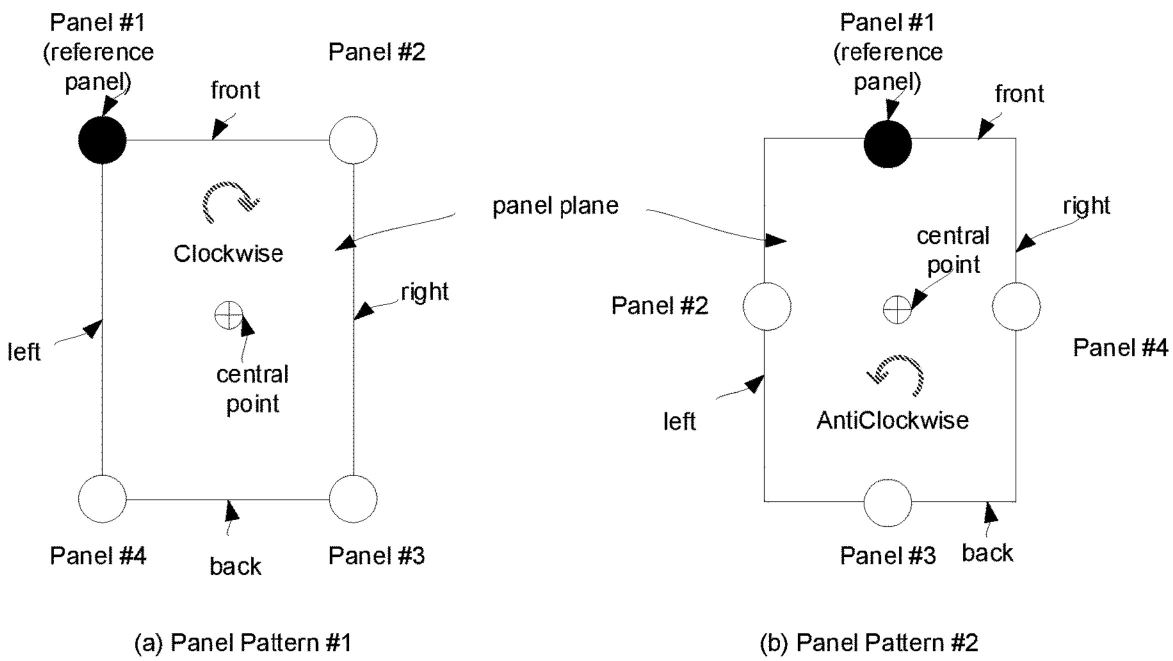
FIG. 3 illustrates two exemplary panel patterns from top view according to some embodiments of the present application.

In an embodiment of the present application, the information of a panel sequence may indicate an ordered sequence of panels which are distributed on the panel plane and labeled in a given order. For example, the panels in the panel sequence are labeled with Panel #1, Panel #2, Panel #3 and Panel #4, and the order may be clockwise or anticlockwise as shown in FIG. 3.

The configuration of each panel pattern may be organized as a table. For example, the following Table 1 shows an example of a configuration of a panel pattern.

TABLE 1

| Parameter | Description |
|---|---|
| indexPanelPattern | Indicates panel pattern. |
| panelPlane | Indicates the geometric information of a horizontal plane, on which one or more panels are distributed. The parameter can be a sequence of parameters, which further includes parameters of lateralLength, longitudeLength and height (expressed such as in meters). |
| defaultPanelPlane | Indicates default values for a panel plane, which are used in case panelPlane is not set. |
| panelSequence | Indicates the distribution information of the one or more panels on the panel plane. The parameter includes a sequence of elements, each element of which represents a panel and contains the following information:<br>Index of the panel<br>Position of the panel on the panel plane. |
| referencePanel | Indicates the reference panel on the panel plane. |

Referring to Table 1, the configuration of a panel pattern may include: a parameter "indexPanelPattern" which is an index indicating the panel pattern; a parameter "panelPlane" which indicates a panel plane on which one or more panels of the panel pattern are deployed, and may include a sequence of parameters including "lateralLength," "longitudeLength," and "height" of the panel plane; a parameter "defaultPanelPlane" which indicates default values for a panel plane and are used in the case that the parameter "panelPlane" is not set; a parameter "panelSequence" which indicates the distribution information of the one or more panels on the panel plane, and may include a sequence of elements, each of which may represent a panel and contain the following information: an index of the panel; and a position of the panel on the panel plane; and a parameter "referencePanel" which indicates the reference panel on the panel plane.

FIG. 2 illustrates an exemplary panel pattern from side view according to some embodiments of the present application. The panel pattern in FIG. 2 may be determined based on a configuration of the panel pattern.

For example, the configuration of the panel pattern may include the index of panel pattern, which is panel pattern #1 in FIG. 2.

Moreover, the configuration of the panel pattern may also include the information of a panel plane, which includes three parameters "lateralLength," "longitudeLength," and "height." The panel plane of the panel pattern #1 in FIG. 2 may be determined based on the three parameters.

Furthermore, the configuration of panel pattern may also include the information of a panel sequence, which indicates the number of panels and the location of the panels in the panel pattern #1 in FIG. 2.

For example, the information of a panel sequence in FIG. 2 may include four elements, and each element may represent a panel and include the following information: an index of a panel; and a position of the panel on the panel plane. For example, the first element may include: a panel index "1" and the position of panel #1 on the panel plane. The second element may include: a panel index "2" and the position of panel #2 on the panel plane. The third element may include: a panel index "3" and the position of panel #3 on the panel plane. The fourth element may include: a panel index "4" and the position of panel #4 on the panel plane. Alternatively or additionally, the information of the panel sequence may indicate that the order of the four panels on the panel plane is clockwise (from top view).

In an embodiment, the position of a panel may be represented by a two-element parameter, in which the first element denotes the side information of the panel and the second element denotes the panel's location on the side. For example, it is assumed that four sides (e.g., front, right, back, and left) of the panel plane may be denoted by natural numbers of 1, 2, 3 and 4, respectively, and three locations on each side observed from the central point of the panel plane, such as left, middle, and right, may be denoted by natural numbers of 1, 2 and 3, respectively. Then, the position of panel #1 may be (1, 1), the position of panel #2 may be (1, 3), the position of panel #3 may be (3, 1), and the position of panel #4 may be (3, 3).

Additionally or alternatively, the configuration of the panel pattern may include information of a reference panel, which indicates that panel #1 is the reference panel for the panel pattern #1 as shown in FIG. 2.

FIG. 3 illustrates two exemplary panel patterns from top view according to some embodiments of the present application.

Referring to FIG. 3, the two panel patterns may be panel pattern #1 and panel pattern #2, respectively. The panel pattern #1 may be determined based on a configuration of the panel pattern #1 received by the UE, which may be the same as the configuration of the panel pattern #1 as shown in FIG. 2.

The panel pattern #2 may be determined based on another configuration of the panel pattern #2 received by the UE. For example, the configuration of the panel pattern #2 may include the index of panel pattern #2. Moreover, the configuration of the panel pattern #2 may also include the information of a panel plane, which may be the same as that of the panel pattern #1. Furthermore, the configuration of the panel pattern #2 may also include the information of a panel sequence, which indicates the number of panels and the location of the panels in the panel pattern #2.

For example, the information of the panel sequence for the panel pattern #2 may include four elements, and each element may represent a panel and include the following information: an index of a panel; and a position of the panel on the panel plane. That is, for the panel pattern #2, similar to the panel pattern #1, the first element may also include: a panel index "1" and the position of panel #1 on the panel plane. The second element may also include: a panel index "2" and the position of panel #2 on the panel plane. The third element may also include: a panel index "3" and the position of panel #3 on the panel plane. The fourth element may also include: a panel index "4" and the position of panel #4 on the panel plane.

The differences between the panel pattern #1 and the panel pattern #2 lie in the order of the sequence and the position of each panel. For example, the information of the panel sequence for the panel pattern #2 may indicate that the order of the four panels on the panel plane is anticlockwise.

Moreover, the positions of the four panels in the panel pattern #2 are different from those in the panel pattern #1. In an embodiment, the position of a panel may still be represented by a two-element parameter, wherein the first element denotes the side information of the panel plane and the second element denotes the panel's location on the side. For example, it is assumed that four sides (e.g., front, right, back, and left) of the panel plane may be denoted by natural numbers of 1, 2, 3 and 4, respectively, and three locations on each side observed from the central point of the panel plane, such as left, middle, and right, may be denoted by natural number of 1, 2 and 3, respectively. Then, for the panel pattern #2, the position of panel #1 may be (1, 2), the position of panel #2 may be (4, 2), the position of panel #3 may be (3, 2), and the position of panel #4 may be (2, 2).

Additionally or alternatively, the configuration of the panel pattern #2 may include information of a reference panel, which indicates that panel #1 is the reference panel for the panel pattern #2.

Resource Allocation Principle

Given a panel pattern of a UE, to position the UE, another UE may perform measurements on multiple signals originating from different panels of a panel pattern of the UE. The measurement results of the multiple signals will be used as an input for location estimation of the UE. In some embodiments of the present application, the signals may be referred to as SL-PRS. The SL-PRS is a sidelink signal used for measurements such as time of arrival (ToA).

Accordingly, the configuration information for SL positioning may include at least one resource allocation principle associated with the at least one panel pattern for transmitting the SL-PRS.

According to some embodiments of the present application, the at least one resource allocation principle included in the configuration information for SL positioning may only include one resource allocation principle for all of the at least one panel pattern indicated by the configuration information for SL positioning.

The one resource allocation principle may indicate at least one of: SL-PRS resources are uniformly allocated to all panels of each panel pattern of the at least one panel pattern; and a transmission power is uniformly allocated among all panels of each panel pattern of the at least one panel pattern. The SL-PRS resources may include one of: SL-PRS resources in frequency domain; SL-PRS resources in time domain; and SL-PRS resources in frequency domain and time domain.

For example, assuming that the configuration of at least one panel pattern includes configuration for the panel pattern #1 and configuration for the panel pattern #2 as shown in FIG. 3, the at least one resource allocation principle may include one resource allocation principle, and thus both the panel pattern #1 and the panel pattern #2 may use the same resource allocation principle.

According to some other embodiments of the present application, each of the at least one resource allocation principle may be associated with a corresponding panel pattern of the at least one panel pattern. Each resource allocation principle indicates at least one of: SL-PRS resources are uniformly allocated to all panels of the corresponding panel pattern; and a transmission power is uniformly allocated among all panels of the corresponding panel pattern. The SL-PRS resources may include one of: SL-PRS resources in frequency domain; SL-PRS resources in time domain; and SL-PRS resources in frequency domain and time domain.

For example, assuming that the configuration of at least one panel pattern includes configuration for the panel pattern #1 and configuration for the panel pattern #2 as shown in FIG. 3, the at least one resource allocation principle may include two resource allocation principles, i.e., one resource allocation principle may be associated with the panel pattern #1 and may indicate that SL-PRS resources in frequency domain are uniformly allocated to all panels of the panel pattern #1; the other resource allocation principle may be associated with the panel pattern #2 and may indicate that SL-PRS resources in time domain are uniformly allocated to all panels of the panel pattern #2.

The used SL-PRS resources are uniformly distributed to all panels of a panel pattern in the way such that the range of SL-PRS resources can be used to identify or implicitly indicate a corresponding panel of the panel pattern.

Assuming that a panel pattern has N panels (N is an integer lager than 0), the resource allocation principle associated with panel pattern may indicate that SL-PRS resources in frequency domain are uniformly allocated to the N panels of the panel pattern. After receiving the resource allocation principle, the target UE may divide the SL-PRS resources in the frequency domain into N equal resource sets (RS) and label the RSs with RS #1, RS #2, . . . , and RS #N from lower frequency to higher frequency. Each RS may be allocated to a panel.

In an embodiment, each RS is allocated to a panel once the RS and the panel are labelled with an identical index. For example, RS #1 is allocated to panel #1, RS #2 is allocated to panel #2, . . . , and RS #N is allocated to panel #N. In another embodiment, RS #1 is allocated to the reference panel, and the remaining RSs are allocated to the panels after the reference panel in sequence. For example, when panel #N-1 is indicated to be the reference panel, RS #1 is allocated to panel #N-1, RS #2 is allocated to panel #N, RS #3 is allocated to panel #1, RS #4 is allocated to panel #2, . . . , and RS #N is allocated to panel #N-2.

After receiving the SL-PRS, another UE (e.g., the measuring UE) may determine the panel of the UE from which the SL-PRS is transmitted based on the RS used for transmitting the SL-PRS.

Figure 4:
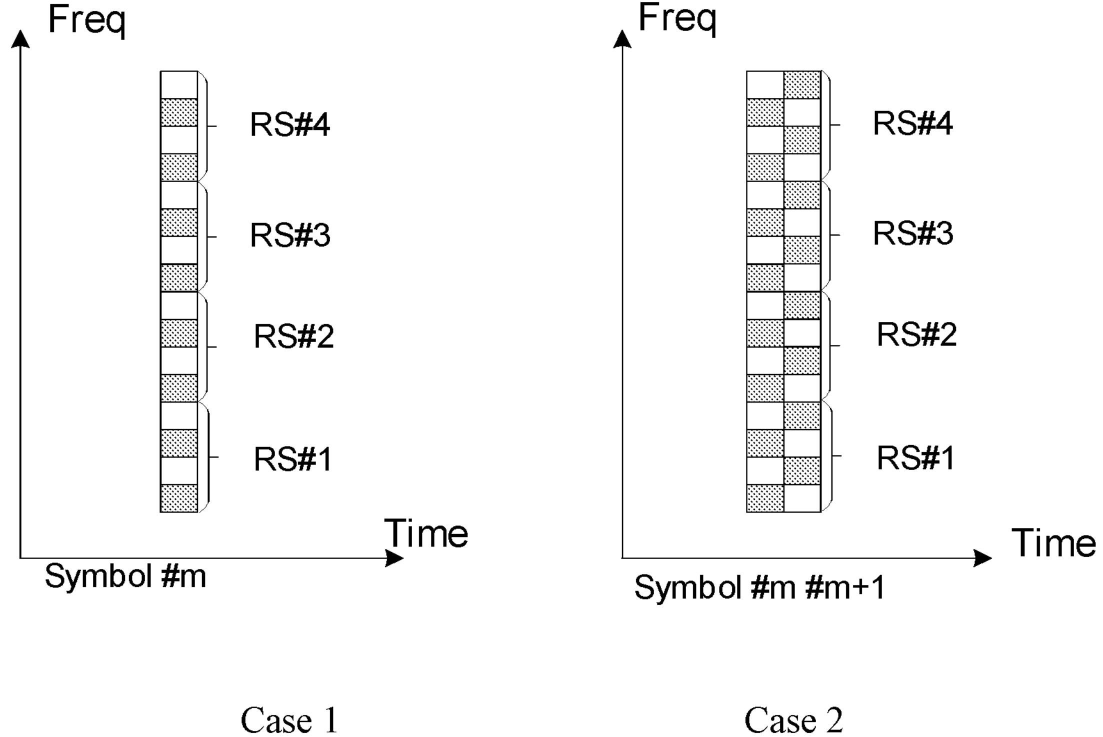
FIGS. 4 and 5 illustrate examples of resource allocation according to some embodiments of the present application.
Figure 5:
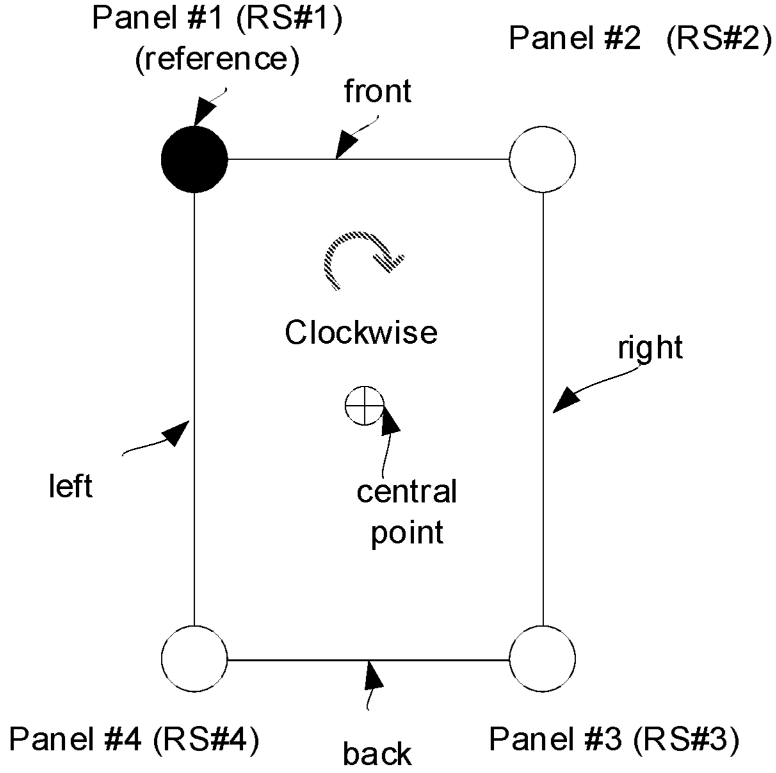

FIGS. 4 and 5 illustrate examples of resource allocation according to some embodiments of the present application.

In the embodiment of FIG. 4, it is assumed that a panel pattern (e.g., the panel pattern #1 as shown in FIG. 3) includes four panels, i.e., panel #1, panel #2, panel #3, and panel #4 and the resource allocation principle indicates that SL-PRS resources in frequency domain are uniformly allocated to the four panels of the panel pattern #1.

Referring to FIG. 4, it includes two cases, i.e., case 1 and case 2. In case 1, it is assumed that only one symbol, namely symbol #m, is used for SL-PRS transmission from four panels of the panel pattern. Then, the resources in the frequency domain are equally divided into RS #1, RS #2, RS #3 and RS #4, which are allocated to panel #1, panel #2, panel #3 and panel #4 for transmitting the SL-PRS, respectively, as shown in FIG. 5.

Case 2 is similar to Case 1 except that two symbols, namely symbol #m and #m+1, are utilized for SL-PRS transmission. That is, in case 2, the resources in the frequency domain are also equally divided into RS #1, RS #2, RS #3 and RS #4, which are allocated to panel #1, panel #2, panel #3 and panel #4 for transmitting the SL-PRS, respectively.

Although FIG. 4 illustrates one or two symbols are used for SL-PRS transmission, it is contemplated that any number of symbols may be used for SL-PRS transmission in some other embodiments of the present application. In addition, although FIG. 5 illustrates one mapping relationship between the panels and the RSs, it is contemplated that other mapping relationship between the panels and the RSs may be used to indicate the panels by the RSs in some other embodiments of the present application.

Uniformly allocating the transmission power among all panels of a panel pattern may enable another UE (e.g., the measuring UE) to proximately determine whether the SL-PRS from the UE (e.g., the target UE) arrives at the receiving antenna of the another UE via a LoS link or NLOS link, since the signals are attenuated severely via an NLOS link compared to via a LoS link.

In an embodiment, the total transmission power for SL-PRS transmission may be per panel pattern and thus can be implicitly indicated by the index of the panel pattern. That is, the panel pattern index is associated with a total transmission power for transmitting the SL-PRS. In such embodiment, the target UE may not indicate the total transmission power to the measuring UE once the panel pattern is indicated to the measuring UE. That is, signaling for indicating a total transmission power can be reduced.

In another embodiment, the total transmission power for SL-PRS transmission may be per UE. In such embodiment, the target UE may transmit an indication indicating its total transmission power to the measuring UE.

In some embodiments of the present application, the resource allocation principle may be applied to any SL-PRS pattern as specified in 3GPP standard documents.

Beam Allocation Principle

In some embodiments, due to the boarder bandwidth of high frequency band, the high frequency band may be used for SL positioning to improve positioning accuracy. In such embodiments, beam-based SL-PRS transmission may be employed on the high frequency band to improve signal coverage.

Accordingly, the configuration information for SL positioning may include at least one beam allocation principle associated with the at least one panel pattern for transmitting the SL-PRS.

According to some embodiments of the present application, the at least one beam allocation principle included in the configuration information for SL positioning includes one beam allocation principle for all of the at least one panel pattern. The one beam allocation principle indicates that beams (along with resources used by the beams in some embodiments) used by the UE are uniformly allocated to all panels of each panel pattern of the at least one panel pattern.

For example, assuming that the configuration of at least one panel pattern includes configuration for the panel pattern #1 and the panel pattern #2 as shown in FIG. 3, the at least one beam allocation principle may include only one beam allocation principle, and thus both the panel pattern #1 and the panel pattern #2 may use the same beam allocation principle.

According to some other embodiments of the present application, each of the at least one beam allocation principle is associated with a corresponding panel pattern of the at least one panel pattern. Each beam allocation principle indicates that beams (along with resources used by the beams in some embodiments) used by the UE are uniformly allocated to all panels of the corresponding panel pattern.

For example, assuming that the configuration of at least one panel pattern includes configuration for the panel pattern #1 and configuration for the panel pattern #2 as shown in FIG. 3, the at least one beam allocation principle may include two beam allocation principles: one beam allocation principle may be associated with the panel pattern #1; and the other beam allocation principle may be associated with the panel pattern #2.

The design of the beam allocation principle, i.e., uniformly allocating the beams used by the UE to all panels of a panel pattern, may enable another UE (e.g., the measuring UE) to identify a corresponding panel via the beams used by the panel. Uniformly allocating the beams to all panels of a panel pattern may mean that all the panels of the panel pattern may have the same number of beams and the beam directions for different panels are symmetrical about the central point of the panel plane.

Figure 6:
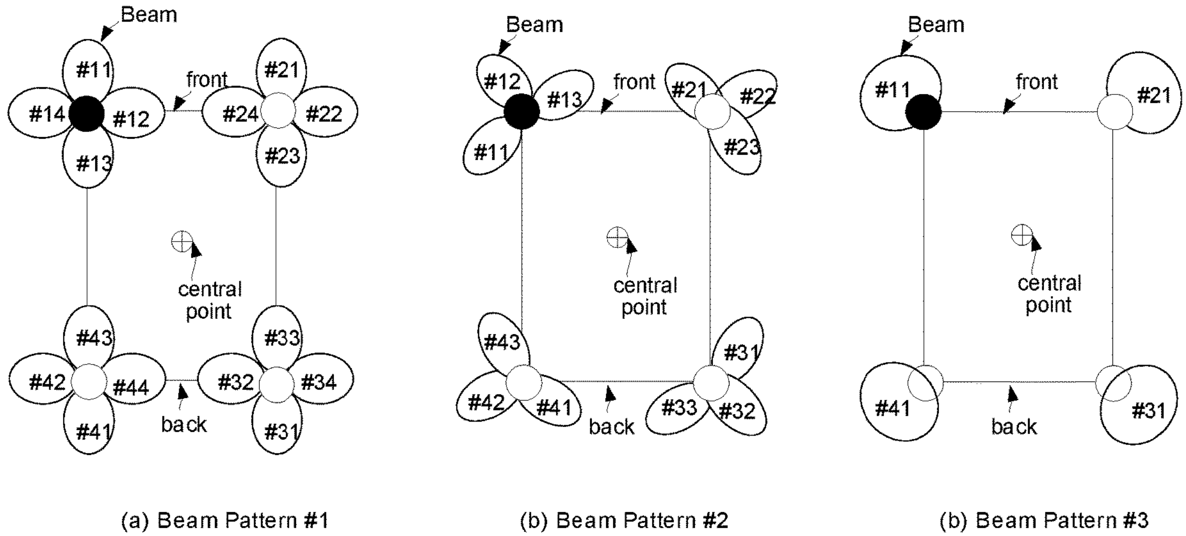
FIG. 6 illustrates three exemplary beam patterns according to some embodiments of the present application.

FIG. 6 illustrates three exemplary beam patterns according to some embodiments of the present application.

Referring to FIG. 6, the panel pattern may be the panel pattern #1 as shown in FIG. 3, which includes four panels, i.e., panel #1, panel #2, panel #3, and panel #4. The beam allocation principle may indicate that the beams used by the UE are uniformly allocated to four panels of the panel pattern #1. That is, all the panels of the panel pattern #1 may have the same number of beams and the beam directions for different panels are symmetrical about the central point of the panel plane.

Based on the beam allocation principle, three beam patterns, i.e., beam pattern #1, beam pattern #2, and beam pattern #3 may be used by the UE for SL-PRS transmission. All beam patterns may follow the above beam allocation principle but have different numbers and width of the beams. However, selecting which beam pattern for SL-PRS transmission is up to UE implementation.

Referring to beam pattern #1, each panel may use four beams and the directions of the four beams cover 360 degree. For example, panel #1 may use beam #11, beam #12, beam #13, and beam #14; panel #2 may use beam #21, beam #22, beam #23, and beam #24; panel #3 may use beam #31, beam #32, beam #33, and beam #34; and panel #4 may use beam #41, beam #42, beam #43, and beam #44.

Referring to beam pattern #2, each panel may use three beams and the directions of the three beams do not include a direction towards the inside of the UE (or the inside of the panel plane). For example, panel #1 may use beam #11, beam #12, and beam #13; panel #2 may use beam #21, beam #22, and beam #23; panel #3 may use beam #31, beam #32, and beam #33; and panel #4 may use beam #41, beam #42, and beam #43. The total direction coverage of the three beams allocated to each panel is symmetrical about the central point of the panel plane.

Referring to beam pattern #3, each panel may use one beam and the one beam may cover a broad space range and do not include a direction towards the inside of the UE (or the inside of the panel plane). For example, panel #1 may use beam #11; panel #2 may use beam #21; panel #3 may use beam #31; and panel #4 may use beam #41. The direction coverage of the beam allocated to each panel is symmetrical about the central point of the panel plane.

Regarding the SL-PRS resources used by each beam allocated to a panel, in an embodiment, all the SL-PRS resources used for a panel may be uniformly distributed to all beams allocated to the panel; in another embodiment, each beam of a panel may use all the SL-PRS resources allocated to the panel.

Figure 7:
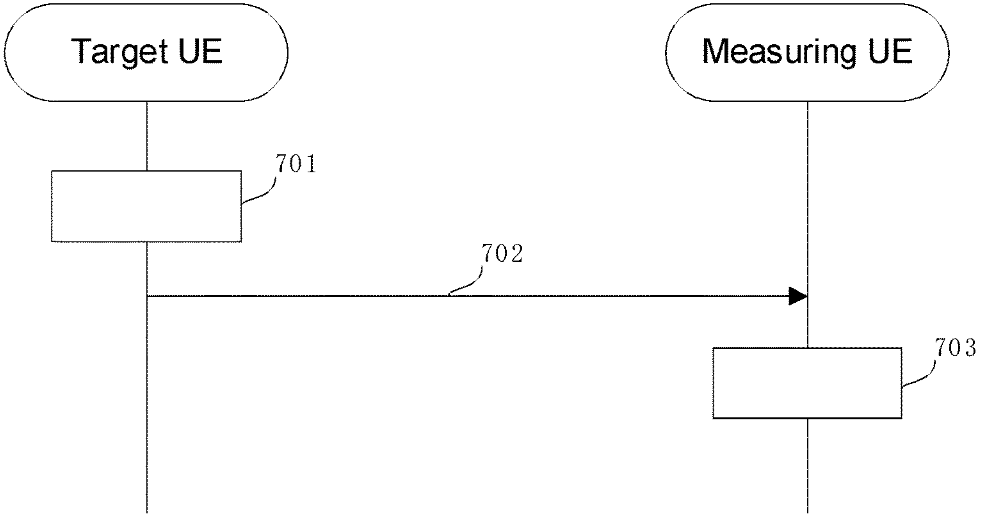
FIG. 7 is a flow chart illustrating an exemplary method for SL positioning according to some embodiments of the present application.
Figure 9:
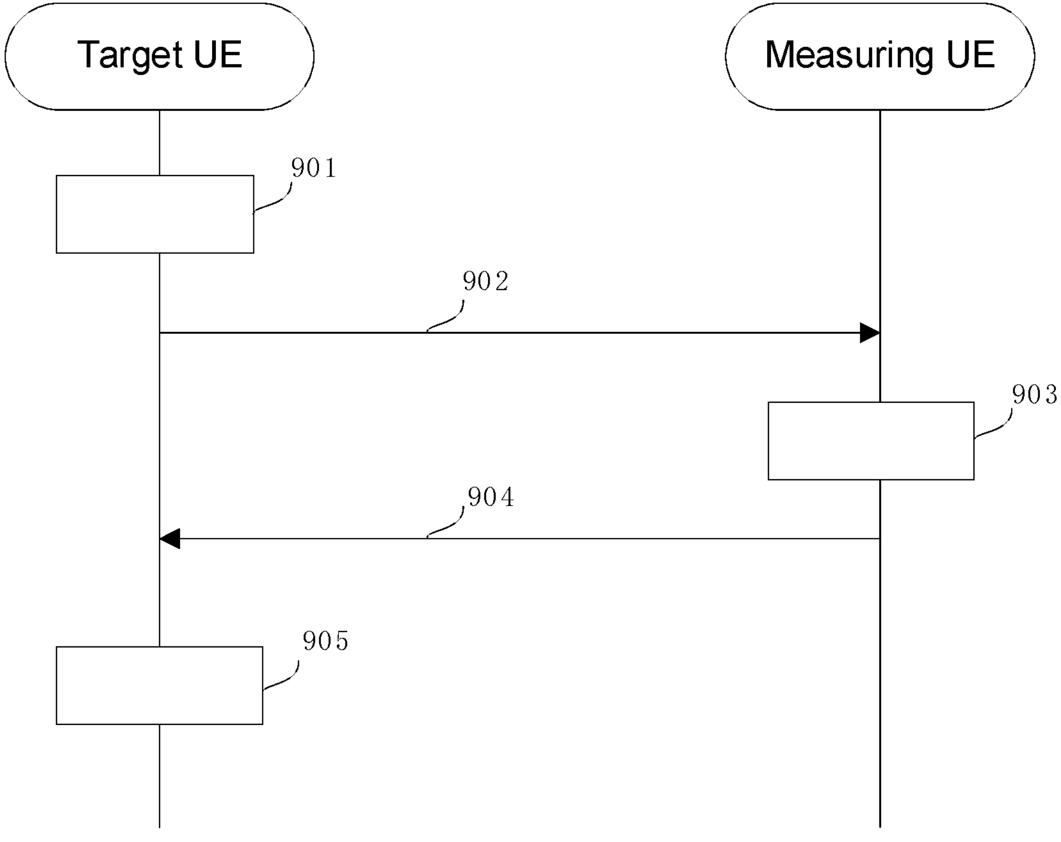
FIG. 9 is a flow chart illustrating an exemplary method for SL positioning according to some other embodiments of the present application.

After receiving the configuration information for SL positioning, the target UE and the measuring UE may perform an exemplary method as shown in FIG. 7 or FIG. 9 to position the target UE.

FIG. 7 is a flow chart illustrating an exemplary method for SL positioning according to some embodiments of the present application. Although the method is illustrated in a system level by a target UE (e.g., UE 102*a* in FIG. 1) and a measuring UE (e.g., UE 102*b* in FIG. 1), persons skilled in the art can understand that the method implemented in the target UE and that implemented in the measuring UE can be separately implemented and incorporated in other apparatus with the likewise functions. The target UE may refer to a UE which is to be positioned and transmits the SL-PRS, and the measuring UE may refer to a UE which performs measurements on the SL-PRS for positioning the target UE. In an embodiment of the present application, both the target UE and the measuring UE are VUEs.

In the exemplary method shown in FIG. 7, after the target UE and the measuring UE receive the configuration information for SL positioning (not shown in FIG. 7), in step 701, the target UE may determine a set of resources for transmitting the SL-PRS according to the received configuration information for SL positioning.

In some embodiments of the present application, determining the set of resources may include at least one of:

- Selecting a panel pattern including a set of panels from the at least one panel pattern. In an embodiment, the target UE may select a panel pattern when multiple panel patterns are configured for the used resource pool. The selection may also consider the UE capability such as antenna deployment.
- Selecting a beam pattern including a set of beams. This operation may be performed in the case that the beam-based SL-PRS transmission is determined by the target UE or by the network.
- Selecting an SL-PRS pattern and a set of SL-PRS resources to be used for the SL-PRS pattern. The resource selection can reuse resource selection methods as specified in 3GPP standard documents.
- Allocating the set of SL-PRS resources to the set of panels of the selected panel pattern based on a resource allocation principle associated with the selected panel pattern. For example, the set of SL-PRS resources may be allocated to four panels of the panel pattern as shown in FIGS. 4 and 5.
- Allocating the set of SL-PRS resources to the set of beams of the selected beam pattern based on a beam allocation principle associated with the selected panel pattern in the case that the beam-based SL-PRS transmission is determined by the target UE or by the network. In an embodiment, all the SL-PRS resources allocated to a panel may be uniformly distributed to all beams of the panel; in another embodiment, each beam allocated to a panel may use all the SL-PRS resources allocated to the panel.

After determining the set of resources for transmitting the SL-PRS, in step 702, the target UE may transmit the SL-PRS based on the determined set of resources.

In some embodiments, in addition to transmitting the SL-PRS, in step 702, the target UE may also transmit a panel pattern index of the selected panel pattern to the measuring UE. After receiving the panel pattern index, the measuring UE may determine the panel pattern selected by the target UE, the corresponding panel plane of the target UE and the position of the panels on the panel plane, the resource allocation principle for the panel pattern, and the beam allocation principle for the panel pattern used by the target UE, such that the measuring UE may measure the SL-PRS originating from different panels of the target UE, and use the measurement results as input for location estimation of the target UE.

In an embodiment, the panel pattern index may be transmitted in SCI, e.g., 1$^{st}$ stage SCI or 2$^{nd}$ stage SCI as specified in 3GPP standard documents. In another embodiment, the panel pattern index may be transmitted in PSSCH.

In an embodiment of the present application, the panel pattern index is associated with a total transmission power for transmitting the SL-PRS. After obtaining the panel pattern index, the measuring UE may determine the total transmission power, and then the measuring UE may proximately determine whether the SL-PRS arrives at the receiving antenna of the measuring UE via a LoS link or NLOS link.

In some other embodiments, the SL-PRS implicitly indicates a panel pattern index of a panel pattern used for transmitting the SL-PRS. In such embodiments, the index of the panel pattern selected by the target UE does not need to be explicitly transmitted to the measuring UE. For example, in the case that the panel pattern and the SL-PRS pattern are associated with the zone information, the measuring UE may determine the panel pattern and the SL-PRS pattern based on the zone information associated with a determined zone ID.

In some other embodiments, the total transmission power for SL-PRS transmission may be per UE. In such embodiments, in step 702, the target UE may also transmit an indication indicating the total transmission power to the measuring UE such that the measuring UE may proximately determine whether the SL-PRS arrives at the receiving antenna via a LoS link or NLOS link.

In some other embodiments, in addition to transmitting the SL-PRS, in step 702, the target UE may also transmit assistance information to the measuring UE for facilitating estimating the location of the target UE. In an embodiment of the present application, the assistance information may include information of the panel plane when such information is not included in the configuration of a panel pattern.

In an embodiment of the present application, the assistance information may be transmitted in SCI or PSSCH.

In some other embodiments, the information of the panel plane (e.g., the size information of the panel plane) may be indicated by a UE type of the target UE. In such embodiments, when the information of the panel plane is not included in the configuration of a panel pattern, in step 702, the target UE may also transmit an indication of a UE type of the target UE to the measuring UE.

After receiving the SL-PRS (and at least one of: an index of a panel pattern, an indication of a total transmission power, assistance information, and an indication of a UE type of the target UE in some other embodiments), in step 703, the measuring UE may perform a measurement on the received SL-PRS to determine a measurement result of the SL-PRS. For example, the measuring UE may measure the ToA of the SL-PRS between each pair of panels which include a measured panel of the target UE and a measuring panel of the measuring UE.

Then, the measuring UE may estimate location estimation and orientation information of the target UE based on the measurement result of the SL-PRS and a panel pattern used for transmitting the SL-PRS.

In some embodiments of the present application, the measuring UE may estimate a relative location between a measuring panel of the measuring UE and a measured panel of the target UE by triangularization with input of the corresponding ToA and the size information of the panel plane of the target UE. Since the skeleton of the target UE may be represented by its panel positions, when the panel positions are determined, the location information of the target UE can be determined.

In some embodiments, the measuring UE may estimate the orientation information of the target UE. In an embodiment of the present application, the measuring UE may estimate geometric information (such as orientation, which is denoted by a in FIG. 8) of the target UE based on one or more relative locations between measuring panel(s) of the measuring UE and measured panel(s) of the target UE.

Figure 8:
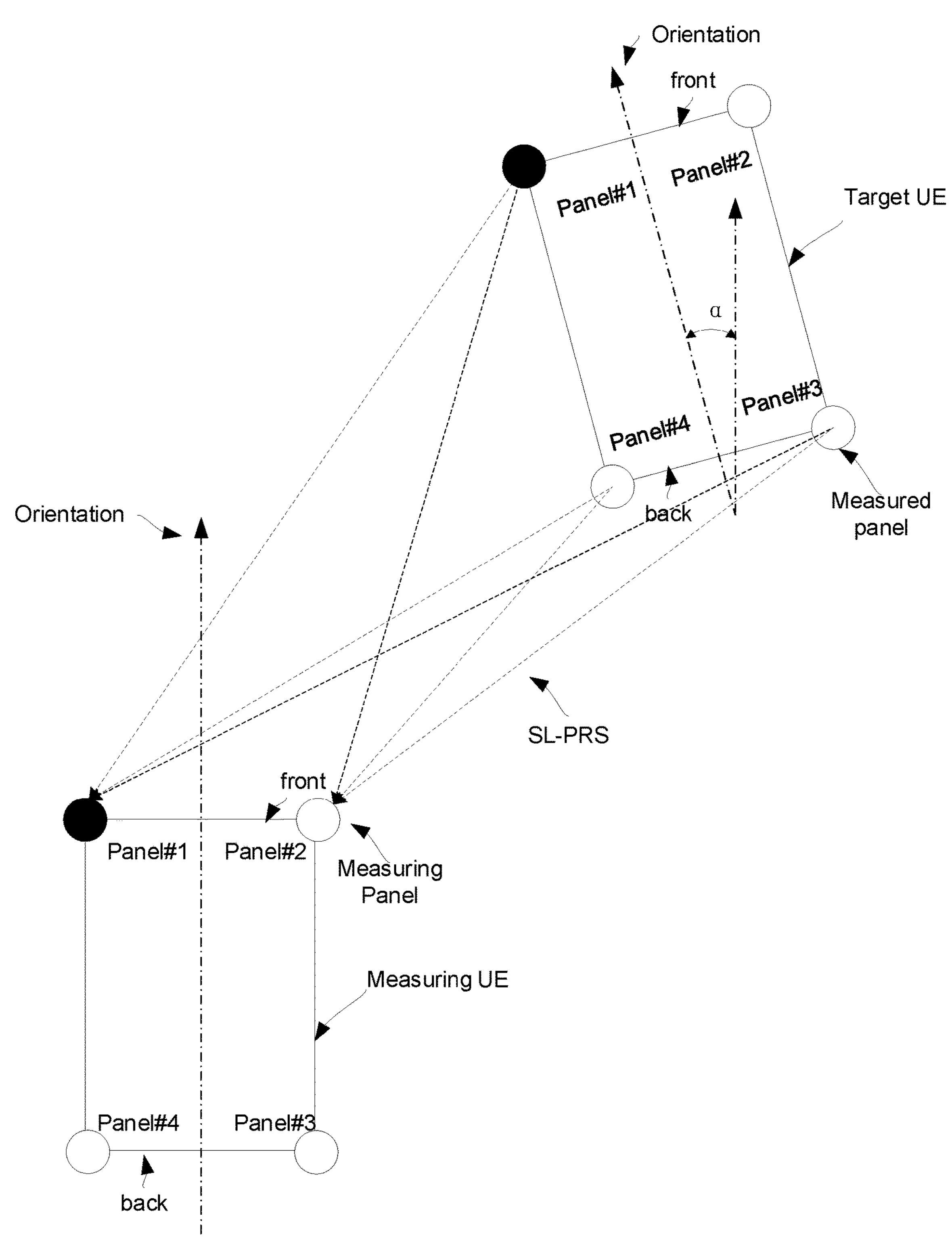
FIG. 8 illustrates an example of multiple-panel based SL positioning according to some embodiments of the present application.

FIG. 8 illustrates an example of multiple-panel based SL positioning according to some embodiments of the present application.

Referring to FIG. 8, both the target UE and the measuring UE may use the panel pattern #1 as shown in FIG. 3. The four panels, i.e., panel #1, panel #2, panel #3, and panel #4 of the target UE may transmit SL-PRS to the measuring UE. Because of blocking by bodies of the target UE and the measuring UE, only panel #1 and panel #2 of the measuring UE can receive the SL-PRS from panel #1, panel #3, and panel #4 of the target UE, which is shown in FIG. 8.

For panel #1 of the measuring UE, the measuring UE may measure three ToAs based on SL-PRS originating from panel #1, panel #3, and panel #4 of the target UE, respectively. For panel #2 of the measuring UE, the measuring UE may measure three ToAs based on SL-PRS originating from panel #1, panel #3, and panel #4 of the target UE, respectively, Then, the measuring UE may estimate a relative location between a measuring panel (e.g., panel #1 or panel #2 of the measuring UE) and a measured panel (e.g., panel #1 or panel #3 or panel #4 of the target UE) by triangularization with input of the ToA between the measuring panel and the measured panel and the size information of the panel plane of the target UE.

After estimating one or more relative locations, the measuring UE may estimate geometric information (such as orientation, which is denoted by a in FIG. 8) of the target UE based on the one or more relative locations.

FIG. 9 is a flow chart illustrating an exemplary method for SL positioning according to some other embodiments of the present application. Although the method is illustrated in a system level by a target UE (e.g., UE 102*a* in FIG. 1) and a measuring UE (e.g., UE 102*b* in FIG. 1), persons skilled in the art can understand that the method implemented in the target UE and that implemented in the measuring UE can be separately implemented and incorporated in other apparatus with the like functions. The target UE may refer to a UE which is to be positioned and transmits the SL-PRS, and the measuring UE may refer to a UE which performs measurements on the SL-PRS for positioning the target UE. In an embodiment of the present application, both the target UE and the measuring UE are VUEs.

In the exemplary method shown in FIG. 9, after the target UE and the measuring UE receive the configuration information for SL positioning (not shown in FIG. 9), in step 901, the target UE may determine a set of resources for transmitting the SL-PRS according to the received configuration information for SL positioning. The operation performed by the target UE in step 901 may be the same as that performed in step 701 in FIG. 7.

After determining the set of resources for transmitting the SL-PRS, in step 902, the target UE may transmit the SL-PRS based on the determined set of resources.

In some embodiments, in addition to transmitting the SL-PRS, in step 902, the target UE may also transmit a panel pattern index of the selected panel pattern to the measuring UE. After receiving the panel pattern index, the measuring UE may determine the panel pattern selected by the target UE, the corresponding panel plane of the target UE and the position of the panels on the panel plane, the resource allocation principle for the panel pattern, and the beam allocation principle for the panel pattern used by the target UE, such that the measuring UE may measure the SL-PRS originating from different panels of the target UE.

In an embodiment, the panel pattern index may be transmitted in SCI, e.g., $1^{st}$ stage SCI or $2^{nd}$ stage SCI as specified in 3GPP standard documents. In another embodiment, the panel pattern index may be transmitted in PSSCH.

In an embodiment of the present application, the panel pattern index is associated with a total transmission power for transmitting the SL-PRS. After obtaining the panel pattern index, the measuring UE may determine the total transmission power, and then the measuring UE may proximately determine whether the SL-PRS arrives at the receiving antenna of the measuring UE via a LoS link or NLOS link.

In some other embodiments, the SL-PRS implicitly indicates a panel pattern index of a panel pattern used for transmitting the SL-PRS. In such embodiments, the index of the panel pattern selected by the target UE does not need to be explicitly transmitted to the measuring UE. For example, in the case that the panel pattern and the SL-PRS pattern are associated with the zone information, the measuring UE may determine the panel pattern and the SL-PRS pattern based on the zone information associated with a determined zone ID.

In some other embodiments, the total transmission power for SL-PRS transmission may be per UE. In such embodiments, in step 902, the target UE may also transmit an indication indicating the total transmission power to the measuring UE such that the measuring UE may proximately determine whether the SL-PRS arrives at the receiving antenna via a LoS link or NLOS link.

After receiving the SL-PRS (and at least one of: index of a panel pattern, an indication of a total transmission power in some other embodiments), in step 903, the measuring UE may perform a measurement on the received SL-PRS to determine a measurement result of the SL-PRS. For example, the measuring UE may measure the ToA of the SL-PRS between each pair of panels which include a measured panel of the target UE and a measuring panel of the measuring UE.

The difference between the method in FIG. 9 and the method in FIG. 7 is that: in FIG. 7, it is the measuring UE that estimates location and orientation information of the target UE, whereas in FIG. 9, it is the target UE that estimates location and orientation information of the target UE.

Given this, in step 904, the measuring UE may transmit the measurement result of the SL-PRS and assistance information of the measuring UE to the target UE. The assistance information of the measuring UE may indicate a panel pattern of the measuring UE based on which the measuring UE determines the measurement result.

After receiving the measurement result of the SL-PRS and assistance information of the measuring UE, in step 905, the target UE may estimate location and orientation information of the target UE based on the measurement result of the SL-PRS and the panel pattern of the measuring UE indicated by the assistance information of the measuring UE.

In some embodiments of the present application, the target UE may estimate a relative location between a measuring panel of the measuring UE and a measured panel of the target UE by triangularization with input of the corresponding ToA and the size information of the panel plane of the measuring UE. Since the skeleton of the target UE may be represented by its panel positions, when the panel positions are determined, the location information of the target UE can be determined.

In some embodiments, the target UE may estimate the orientation information of the target UE. In an embodiment of the present application, the target UE may estimate geometric information (such as orientation, which is denoted by a in FIG. 8) of the target UE based on one or more relative locations between measuring panel(s) of the measuring UE and measured panel(s) of the target UE.

Figure 10:
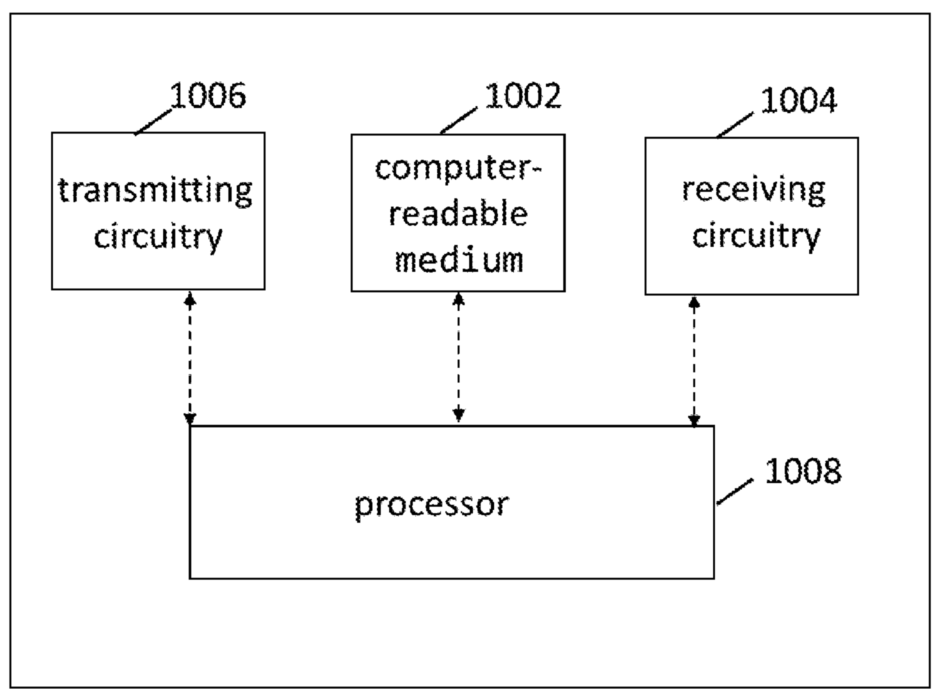
FIG. 10 illustrates a simplified block diagram of an exemplary apparatus for SL positioning according to some embodiments of the present application.

FIG. 10 illustrates a simplified block diagram of an exemplary apparatus 1000 for SL positioning according to some embodiments of the present application. The apparatus 1000 may include a UE (e.g., a target UE or a measuring UE) or a BS as shown in FIG. 1.

Referring to FIG. 10, the apparatus 1000 may include at least one non-transitory computer-readable medium 1002, at least one receiving circuitry 1004, at least one transmitting circuitry 1006, and at least one processor 1008. In some embodiments of the present application, the at least one receiving circuitry 1004 and the at least one transmitting circuitry 1006 can be integrated into at least one transceiver. The at least one non-transitory computer-readable medium 1002 may have computer executable instructions stored therein. The at least one processor 1008 may be coupled to the at least one non-transitory computer-readable medium 1002, the at least one receiving circuitry 1004 and the at least one transmitting circuitry 1006. While shown to be coupled to each other via the at least one processor 1008 in the example of FIG. 10, the at least one receiving circuitry 1004, the at least one transmitting circuitry 1006, the at least one non-transitory computer-readable medium 1002, and the at least one processor 1008 may be coupled to one another in various arrangements. For example, the at least one receiving circuitry 1004, the at least one transmitting circuitry 1006, the at least one non-transitory computer-readable medium 1002, and the at least one processor 1008 may be coupled to each other via one or more local buses (not shown for simplicity). The computer executable instructions stored on the at least one non-transitory computer-readable medium 1002 can be programmed to implement a method with the at least one receiving circuitry 1004, the at least one transmitting circuitry 1006 and the at least one processor 1008. The method may include the operations or steps as shown in FIG. 7 or 9.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for SL positioning, including a processor and a memory. Computer programmable instructions for implementing a method for SL positioning are stored in the memory, and the processor is configured to perform the computer programmable instructions to implement the method for SL positioning. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for SL positioning as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:

at least one memory; and at least one processor coupled with the at least one memory and configured to cause the UE to:

receive configuration information for sidelink (SL) positioning, wherein the configuration information for SL positioning comprises:

a configuration of at least one panel pattern, wherein each panel pattern of the at least one panel pattern comprises one or more panels;

at least one resource allocation principle associated with the at least one panel pattern; and at least one beam allocation principle associated with the at least one panel pattern;

determine a set of resources by selecting a panel pattern comprising a set of panels from the at least one panel pattern;

transmit an SL positioning reference signal (SL-PRS) on a set of resources according to the received configuration information for SL positioning; and transmit a panel pattern index of the selected panel pattern in sidelink control information (SCI) or a physical sidelink shared channel (PSSCH).

2. The UE of claim 1, wherein:

the configuration information for SL positioning is received in a resource pool configuration of a resource pool;

the configuration information for SL positioning is received in a zone configuration of a zone; or the configuration information for SL positioning is specific to the UE.

3. The UE of claim 1, wherein the configuration information for SL positioning is received via:

a system information block (SIB) from a network;

radio resource control (RRC) signaling from the network;

a medium access control (MAC) control element (CE) from the network;

PC5 RRC signaling from a second UE;

a MAC CE from the second UE;

SCI from the second UE; or a pre-configuration.

4. The UE of claim 1, wherein the configuration of at least one panel pattern comprises a configuration of each panel pattern of the at least one panel pattern, and wherein the configuration of each panel pattern includes:

a panel pattern index indicating a corresponding panel pattern;

information of a panel plane on which one or more panels of the corresponding panel pattern are deployed;

information of a panel sequence indicating distribution information of the one or more panels of the corresponding panel pattern on the panel plane; or information of a reference panel.

5. The UE of claim 1, wherein the at least one resource allocation principle comprises one resource allocation principle for all of the at least one panel pattern, and wherein the one resource allocation principle indicates:

SL-PRS resources are uniformly allocated to all panels of each panel pattern of the at least one panel pattern; or a transmission power is uniformly allocated among all panels of each panel pattern of the at least one panel pattern.

6. The UE of claim 1, wherein the at least one beam allocation principle includes one beam allocation principle for all of the at least one panel pattern, and wherein the one beam allocation principle indicates that beams used by the UE are uniformly allocated to all panels of each panel pattern of the at least one panel pattern.

7. The UE of claim 1, wherein the set of resources is based on:

selecting a beam pattern comprising a set of beams;

selecting an SL-PRS pattern and a set of SL-PRS resources to be used for the SL-PRS pattern;

allocating the set of SL-PRS resources to the set of panels of the selected panel pattern based on a resource allocation principle associated with the selected panel pattern; or allocating the set of SL-PRS resources to the set of beams of the selected beam pattern based on a beam allocation principle associated with the selected panel pattern.

8. The UE of claim 7, wherein the at least one processor is further configured to cause the UE to: transmit assistance information associated with the selected panel pattern in the SCI or the PSSCH.

9. The UE of claim 7, wherein the at least one processor is further configured to cause the UE to:

receive, from a second UE, a measurement result of the SL-PRS and assistance information of the second UE; and estimate location estimation and orientation information of the UE based on the measurement result and the assistance information.

10. The UE of claim 9, wherein the assistance information of the second UE indicates a panel pattern of the second UE based the second UE determining the measurement result.

11. A user equipment (UE) for wireless communication, comprising:

at least one memory; and at least one processor coupled with the at least one memory and configured to cause the UE to:

receive configuration information for sidelink (SL) positioning, wherein the configuration information for SL positioning comprises:

a configuration of at least one panel pattern, wherein each panel pattern of the at least one panel pattern comprises one or more panels;

at least one resource allocation principle associated with the at least one panel pattern; or at least one beam allocation principle associated with the at least one panel pattern; and receive an SL positioning reference signal (SL-PRS) on a set of resources determined by a selection of a panel pattern comprising a set of panels from the at least one panel pattern; and receive assistance information associated with the selected panel pattern in sidelink control information (SCI) or a physical sidelink shared channel (PSSCH).

12. A processor for wireless communication, comprising:

at least one controller coupled with at least one memory and configured to cause the processor to:

transmit configuration information for sidelink (SL) positioning, wherein the configuration information for SL positioning comprises:

a configuration of at least one panel pattern, wherein each panel pattern of the at least one panel pattern comprises one or more panels;

at least one resource allocation principle associated with the at least one panel pattern; or at least one beam allocation principle associated with the at least one panel pattern;

transmit an SL positioning reference signal (SL-PRS) on a set of resources determined by a selection of a panel pattern comprising a set of panels from the at least one panel pattern; and transmit assistance information associated with the selected panel pattern in sidelink control information (SCI) or a physical sidelink shared channel (PSSCH).

13. A method performed by a user equipment (UE), the method comprising:

receiving configuration information for sidelink (SL) positioning, wherein the configuration information for SL positioning comprises:

a configuration of at least one panel pattern, wherein each panel pattern of the at least one panel pattern comprises one or more panels;

at least one resource allocation principle associated with the at least one panel pattern; or at least one beam allocation principle associated with the at least one panel pattern;

determining a set of resources by selecting a panel pattern comprising a set of panels from the at least one panel pattern;

transmitting an SL positioning reference signal (SL-PRS) according to the received configuration information for SL positioning; and transmitting a panel pattern index of the selected panel pattern in sidelink control information (SCI) or a physical sidelink shared channel (PSSCH).

14. The method of claim 13, wherein:

the configuration information for SL positioning is received in a resource pool configuration of a resource pool;

the configuration information for SL positioning is received in a zone configuration of a zone; or the configuration information for SL positioning is specific to the UE.

15. The method of claim 13, wherein the configuration information for SL positioning is received via:

a system information block (SIB) from a network;

radio resource control (RRC) signaling from the network;

a medium access control (MAC) control element (CE) from the network;

PC5 RRC signaling from a second UE;

a MAC CE from the second UE;

SCI from the second UE; and pre-configuration.

16. The method of claim 13, wherein the configuration of at least one panel pattern comprises configuration of each panel pattern of the at least one panel pattern, and the configuration of each panel pattern includes:

a panel pattern index indicating a corresponding panel pattern;

information of a panel plane on which one or more panels of the corresponding panel pattern are deployed;

information of a panel sequence indicating distribution information of the one or more panels of the corresponding panel pattern on the panel plane; or information of a reference panel.

17. The method of claim 13, wherein the at least one resource allocation principle comprises one resource allocation principle for all of the at least one panel pattern, and wherein the one resource allocation principle indicates:

SL-PRS resources are uniformly allocated to all panels of each panel pattern of the at least one panel pattern; or a transmission power is uniformly allocated among all panels of each panel pattern of the at least one panel pattern.

18. The method of claim 13, wherein the at least one beam allocation principle includes one beam allocation principle for all of the at least one panel pattern, and wherein the one beam allocation principle indicates that beams used by the UE are uniformly allocated to all panels of each panel pattern of the at least one panel pattern.

* * * * *